Sept. 8, 1964   R. L. JAESCHKE   3,148,294
FLUID-COOLED ROTARY ELECTRICAL APPARATUS
Filed Jan. 25, 1961   3 Sheets-Sheet 2

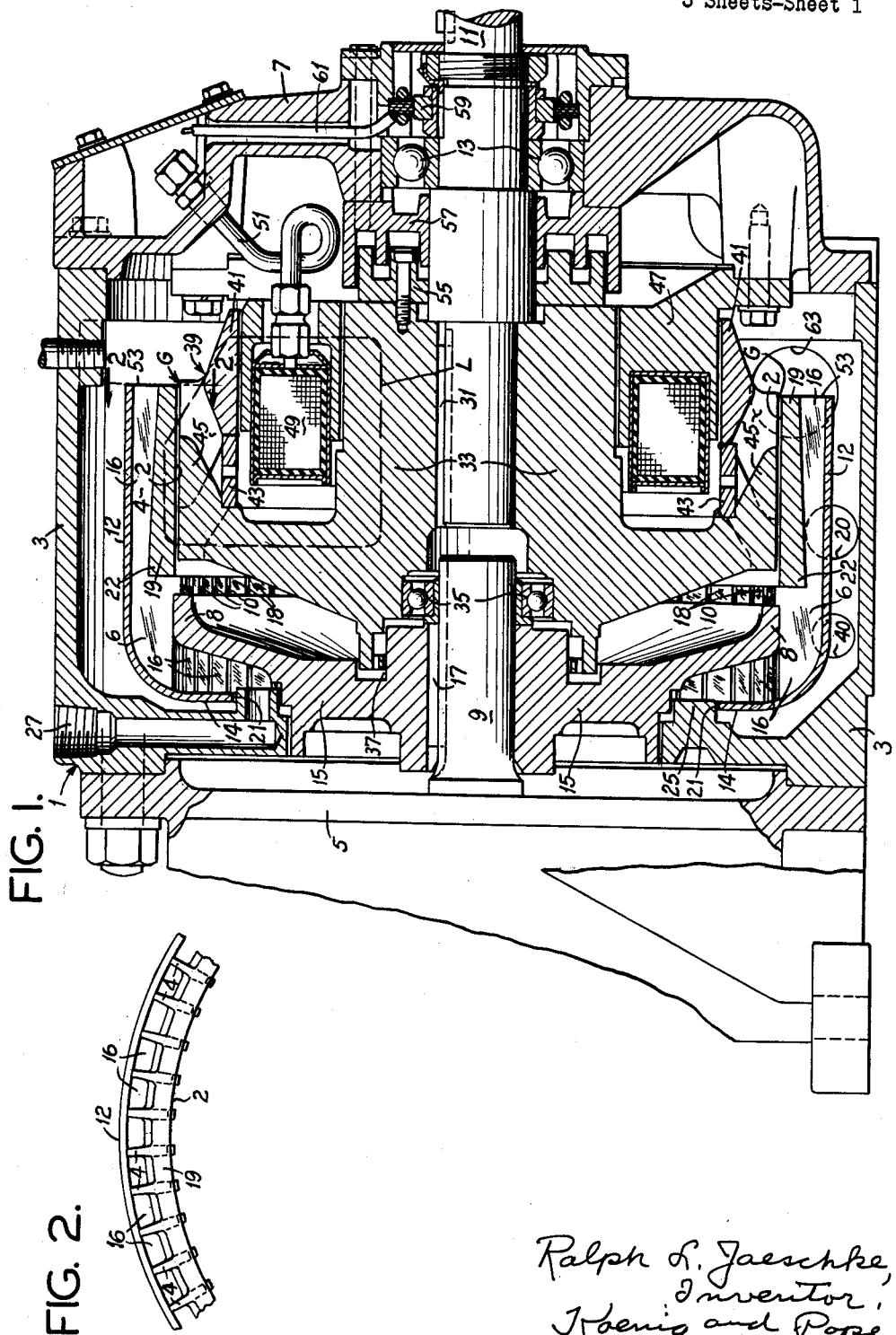

Ralph L. Jaeschke,
Inventor.
Koenig and Pope,
Attorneys.

Sept. 8, 1964  R. L. JAESCHKE  3,148,294
FLUID-COOLED ROTARY ELECTRICAL APPARATUS
Filed Jan. 25, 1961  3 Sheets-Sheet 3
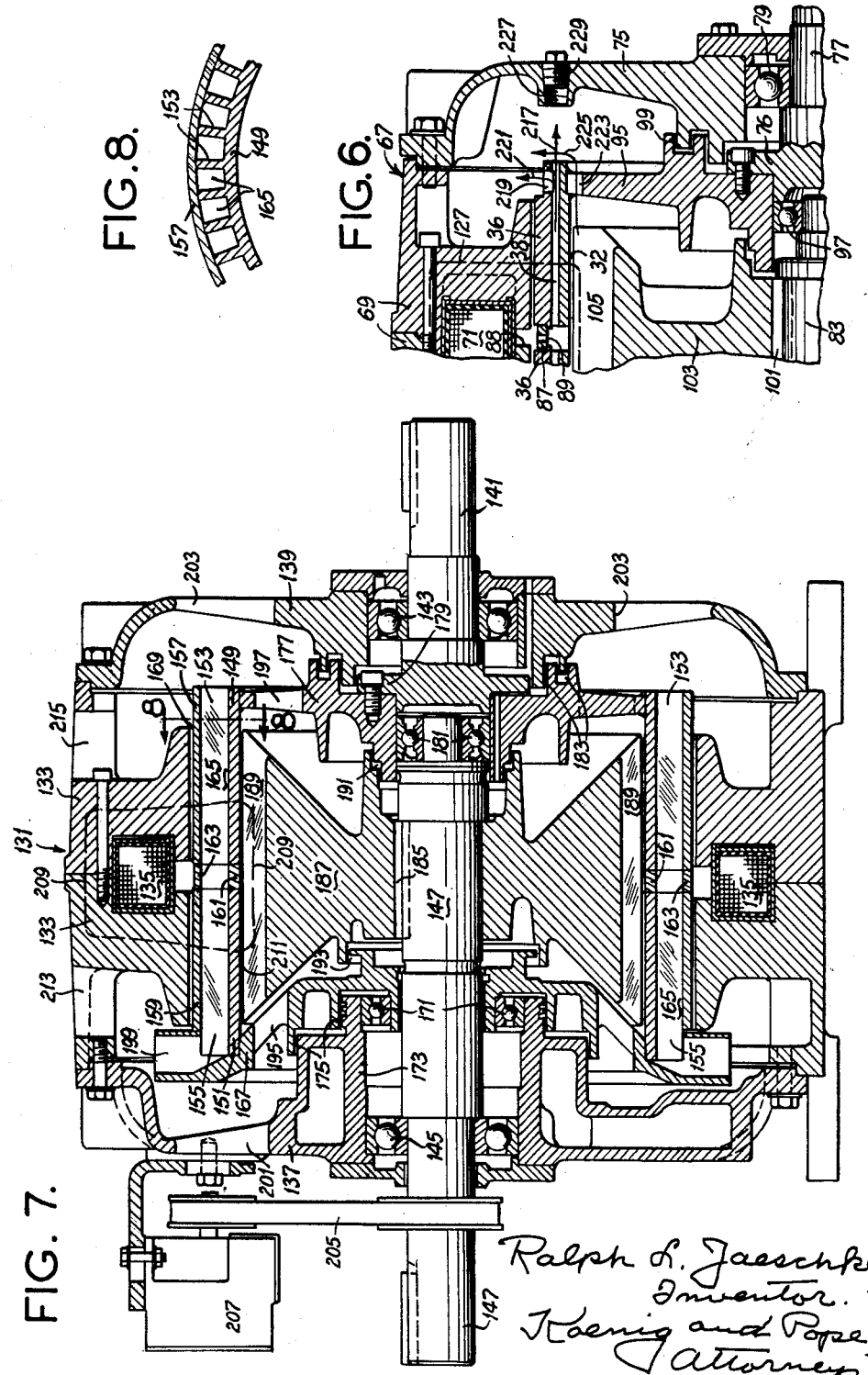

United States Patent Office 3,148,294
Patented Sept. 8, 1964

3,148,294
FLUID-COOLED ROTARY ELECTRICAL
APPARATUS
Ralph L. Jaeschke, Kenosha, Wis., assignor to Eaton
Manufacturing Company, Cleveland, Ohio, a corporation of Ohio
Filed Jan. 25, 1961, Ser. No. 85,957
26 Claims. (Cl. 310—105)

This invention relates to fluid-cooled rotary electrical apparatus and with regard to certain more specific features, to fluid-cooled, eddy-current electric couplings for constructing clutches, brakes, dynamometers and the like.

This application is a continuation-in-part of my United States patent application Serial No. 4,399, filed January 25, 1960, now abandoned, entitled Liquid-Cooled Rotary Electrical Apparatus.

Among the several objects of the invention may be noted the provision of fluid-cooled couplings of both the so-called single-support and double-support types in which by centrifugal action the fluid is pumped substantially in an axial direction through the inductor in which the eddy currents are induced; the provision of liquid-cooled couplings in which the liquid coolant under normal or usual operation is employed without introducing any substantial amount of liquid coolant into its magnetic air gap, thereby in general avoiding unsteady operation; the provision of a liquid-cooled coupling of the class described which under unusual or abnormal operating conditions such as overload heating, clogging or sedimentation of the water passages or the like, will automatically introduce water into the magnetic gap to provide efficient emergency cooling, and if the abnormality is sufficient a signal will be given that such emergency cooling is in effect and that corrective action may be required; and the provision of an air-cooled coupling of the class described in which efficient cooling is established by maximum contact between the air and those parts of the inductor in which eddy-current heating occurs. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, FIG. 1 is an axial section, parts being in elevation, illustrating the invention as applied to a so-called single-support, eddy-current slip coupling or clutch employing water coolant;

FIG. 2 is a fragmentary detail end view of an inductor per se, being viewed on line 2—2 of FIG. 1;

FIG. 6 is a fragmentary view corresponding to parts shown in the upper right-hand portion of FIG. 3, illustrating a modified form of the invention;

FIG. 7 is an axial section of a double-support, air-cooled coupling illustrating an alternative form of the invention; and FIG. 8 is a fragmentary cross section taken on line 8—8 of FIG. 7.

Corresponding reference characters indicate corresponding parts throughout the several views of the drawings.

Figure 3:
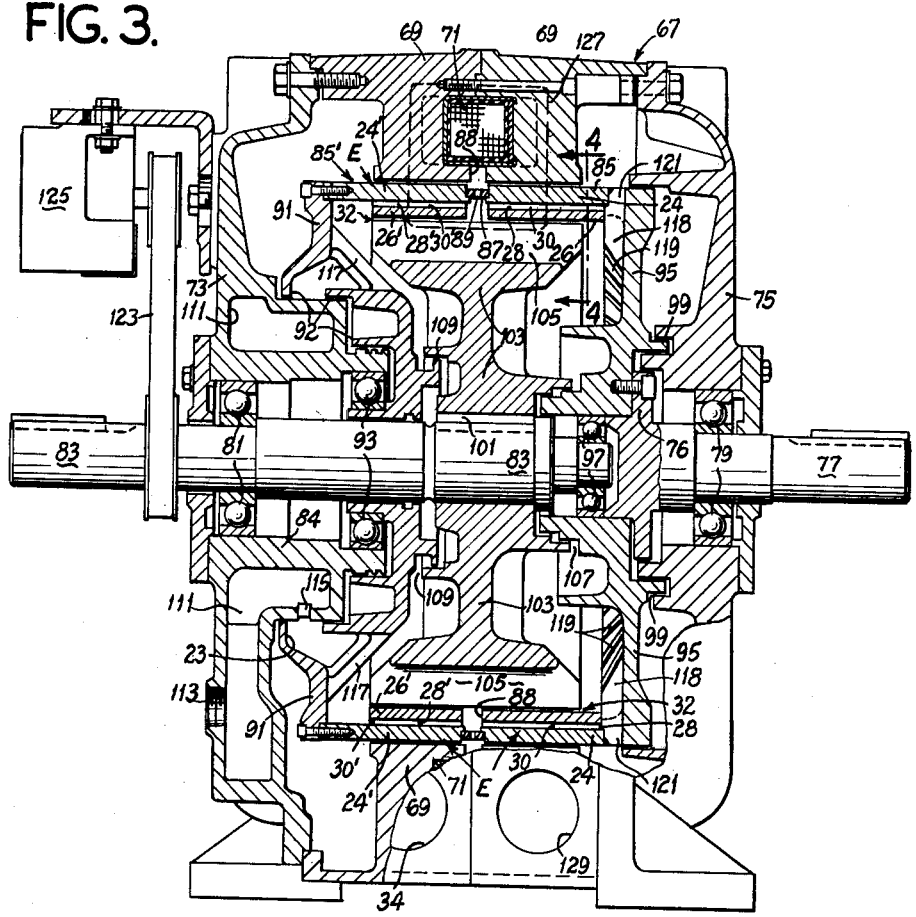
FIG. 3 is an axial section, parts being in elevation, illustrating the invention as applied to a so-called double-support eddy-current slip coupling or clutch employing water coolant.

While the invention is described as applied to so-called eddy-current electric couplings used as slip clutches, in which the inductors carry eddy currents, it will be understood that the invention in some of its forms is applicable also to other electric machines operating on pertinently analogous principles, such as magnetic particle couplings.

Referring now more particularly to FIG. 1, there is shown at numeral 1 a liquid-tight casing consisting of a central housing 3, carrying at its ends closure members 5 and 7, respectively, the former supporting a drive shaft 9 and the latter a driven shaft 11, carried in bearings 13. The closure member 5 may be a part of an associated driving motor (not shown). Such a motor carries bearings supporting the shaft 9.

Keyed to the drive shaft 9 is an inductor drum support 15 (see key 17). At 19 is shown an eddy-current inductor drum composed of a material such as, for example, iron or steel. This has an inner cylindric surface 2. Externally it flares to the left and is provided with outside cooling ribs or fins 4. These extend beyond the left end of the drum, as indicated at 6, where they are internally cylindrically machined to accept the rim 8 of the support 15 for attachment as by welding shown at 10. An equivalent in this regard would be integrally to cast the members 6, 12 and 15. Thus the member 15 supports the inductor drum or cylinder 19 through the extensions 6 of the ribs 4. Surrounding the ribs 4, 6 is a wall formed by a jacket or shroud 12. The end of the shroud 12 is flanged inwardly behind or to the left of the support, as shown at 14, to form an inwardly directed scoop. The fins 4, 6, being spaced from one another, with shroud 12 form coolant passages 16 extending from behind the support 15 and in an axial direction along the outside of the eddy-current drum 19. The margin 8 of the support 15 and the adjacent thick end 22 of the drum 19 are spaced from one another, whereby the rib extensions 6 form inwardly directed passages 18. These extend from the space outside of the support 15 and drum 19 to the space inside of them. The thick end 22 of cylinder 19 forms a deflector as explained below.

The inner margin 21 of the scoop 14 forms a running seal with a stationary annular boss 25, forming part of the housing 3. This seal is of the close free-running type without packing. A coolant inlet nozzle 27 in the housing delivers coolant through the boss 25 to the scoop 14, from which it is centrifugally forced out around the outside of the eddy-current drum 19, via the passages 16 between the fins 4, 6. The parts of the fin extensions 6 forming passages 16 function as a centrifugal pump. Centrifugally pumped coolant progresses from left to right around the outside of drum 19 for ultimate escape from its right-hand end outlets 53 and into the casing 3. Final escape from the casing occurs through a bottom outlet 63. The thick end 22 of drum 19 forms a dam across passages 16, thus critically determining their coolant-carrying capacity.

Keyed to the driven shaft 11 at key 31 is a magnetizable polar field member 33 composed of iron or steel. A pilot bearing 35 is located between drive shaft 9 and the field member 33. Close-running sealing means 37 is provided between members 15 and 33 without interposed packing. Marginally, the pole member 33 carries a magnetic pole assembly 39, consisting of a ring 41 supported on the field member by a nonmagnetic ring 43, the members 33 and 41 carrying spaced interdigitated polar teeth or poles 45 in a manner known in the art.

Closure member 7 has bolted to it a ring-shaped magnetic support 47 for an annular field exciter coil 49. Electrical connections for exciting the field coil are shown at 51. When the field coil 49 is excited, a toroidal magnetic loop, a half section of which is diagrammed by the dotted line L, interlinks the field member and the inductor drum 19. Upon relative rotations between members 33 and 19, eddy currents will be generated in the drum 19, whereby an electromagnetic slip coupling is obtained therebetween in known manner. The eddy currents cause heating of the drum, which therefore is required to be cooled.

Interdigitated labyrinth sealing rings 55 and 57 are attached to the field member 33 and the closure member 7, respectively, these also having close running fits without packing.

A tachometer type of generator 59, driven by shaft 11, supplies current over a line 61 and is suitably connected with the exciting circuit for coil 59 to control excitation in accordance with the speed of the shaft 11. Electrical circuits for this purpose are known and require no description herein. It suffices to say that the excitation of coil 49 increases with decrease in speed of the shaft 11 and vice versa, thus performing a speed-regulating function on shaft 11.

As is known in this class of machinery, thermostatic coolant controls are often used. Thus a temperature-sensing thermostat may be introduced into an opening such as 20, for thermostatic control of a valve in the coolant line serving inlet 27. As the driving load of the machine increases and its temperature rises, the thermostat responds to the resulting increased coolant temperature to admit more coolant into the inlet 27. As temperature falls, less coolant is admitted.

Most efficient heat transfer for cooling may be obtained by introducing coolant into the magnetic air gap G between the inside surface of the drum 19 and the outside surfaces of the poles 45. When a liquid coolant is employed this is known in the art as wet-gap cooling and is satisfactory if the flow of coolant can be kept to an amount which will not reach a depth within the drum 19 such that the ends of the poles 45 are considerably immersed. The greater the immersion, the more tendency there is for unsteady action due to liquid agitation by the poles 45. It is for this reason that wet-gap operation employing substantial amounts of coolant in the drum 19 is normally to be avoided and is so avoided by the present invention, except under emergency conditions, and then only with an amount of coolant in the gap which is less than all required for cooling, as will appear below. By means of the present invention, under normal operating conditions a coolant (such as water, oil, air or the like) passes along the outside of the drum through the passages 16, being finally centrifugally ejected at the end margin 53. This indirectly cools the inner drum surface, since heat needs to be conducted through the drum wall to the outer fins and water. In the case of a gas such as air, some may also flow through the gap G. For normal operating conditions this is a satisfactory mode of operation, i.e., with a dry gap. Under emergency or unusual conditions, wet-gap operation occurs when a liquid coolant is employed.

Operation of the above-described form of the invention is as follows, assuming a liquid coolant:

During operation under load, the eddy-current drum 19 becomes hot. Under normal operating conditions the amount of coolant flowing through the passages 16 and outside of this drum is regulated to be sufficient for cooling. The total area of the cross sections of passages 16 at the deflector or dam 22 is little if any greater than needed to carry this amount freely. However, the hot outside surfaces, fins 4, 6 and shroud 12 are subject to deposition of lime when hard water is used as a coolant, as well as sedimentation, et cetera. This tends to clog the passages 16, restricting the flow of coolant therethrough until a point may be reached at which the amount of cooling thereby is reduced and may become insufficient. Under such circumstances, the inward radial head of coolant in shroud 12 builds up an inward overflow will occur through the passages 18 and into the gap G, through which it progresses from the left to right, to be centrifugally discharged into the casing for combined escape through the outlet 63 of whatever coolant moves through passages 16. This serves the purpose of emergency or unusual cooling by using liquid coolant in the gap G. Another type of unusual cooling is called for when an overload occurs, even without clogging of passages 16. In such case the drum and coolant temperatures rise, whereupon the conventional thermostatic control system calls for more cooling liquid which may be in excess of that able to be carried by passages 16 when clean.

For small amounts of overflow liquid, the operation of the machinery remains steady. If the clogging continues to worsen and/or an overload is great, more water will overflow into the gap until its radial head results in overflow under centrifugal force into the gap. Thus its radial depth in the gap G may reach the ends of the poles 45. If the pole ends become sufficiently immersed, unsteady operating conditions may ensue, acting as a warning that overload is excessive or that the cooling passages 16 require cleaning, or both.

Operation of the above described form of the invention when a gas is used consists in gas flow primarily through the passages 16 and, depending upon the volume of flow, some through gap G. In any event, when a gaseous coolant is used, no wet-gap operation ensues.

In view of the above, it will be seen that the device of FIG. 1, even when liquid coolant is used, functions as a so-called dry-gap, indirectly cooled machine during such periods of time as the coolant passages 16 are effective to carry normal amounts of coolant, and thereafter partly as a wet-gap machine having both direct and indirect cooling. By direct cooling is meant cooling by contact of the liquid with the inner surface of the eddy-current drum 19 (at which highest heating occurs); and by indirect cooling is meant cooling from the outside of the eddy-current drum by means of external passages requiring conduction of heat from the hot eddy-current surfaces along radial paths through the drum. Although indirect cooling is not as efficient as direct cooling, it is sufficient for normal operations, the direct cooling by introduction of liquid into the gap being called upon only during unusual or emergency conditions.

Figure 4:
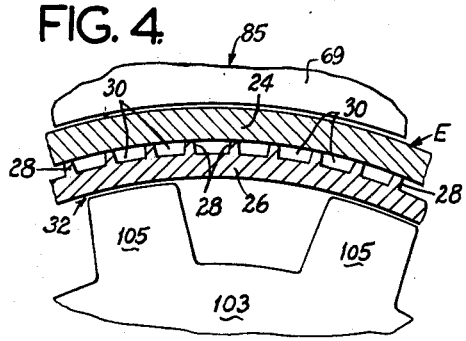
FIG. 4 is an enlarged detail cross section taken on line 4—4 of FIG. 3.

Referring now more particularly to FIGS. 3 and 4, application of a preferably liquid-cooled form of the invention to a double-support type of machine will be described. In this form, numeral 67 in general indicates the casing, consisting of two magnetic pole rings 69, bolted together and adapted to support a central annular exciter field coil 71. At the ends of the assembly 69 are bolted closure members 73 and 75. A drive shaft 77 is supported in a bearing 79 within the closure member 75. Supported upon a bearing 81 in the closure member 73 is a driven shaft 83. At 85, 85' are indicated members of a pair of coaxial inductor drum-forming cylinder subassemblies joined by magnetic ring 87, in which are holes or openings 89 located in the plane of coil 71 across a gap 88. Ring 87 is small enough that it restricts magnetic flux therethrough and may be made nonmagnetic if desired.

The right-hand subassembly 85 (FIGS. 3 and 4) is constituted by an outside ring 24, within which is an exteriorly flanged inductor ring 26. The flanges of ring 26 are shown at 28 and, as indicated in FIG. 4, are sealed to the inside of ring 24, thus forming coolant passages 30. The left-hand subassembly 85' is similar in form and is similarly indexed with primed numerals 24', 26', 28' and 30'. Subassemblies 85, 85' (with connecting ring 87) make up an eddy-current inductor drum or cylinder lettered E as a whole. Adjacent the outside cylindric shape of E are inside cylindric shapes of rings 69. A field-carrying outside gap is thus formed, which, while annularly evenly polarized, is not substantially polarized by any peripheral flux concentrations caused by teeth 105, mentioned below.

Bolted to the left end of the left-hand subassembly 85' is an inductor drum support 91 which is supported upon a bearing 93 carried in a hub 84 of the closure member 73. At 92 are shown free-running packless seals between members 91 and 73. Welded to the right-hand end of the right-hand drum assembly 85 is an enclosure disc 95 which is bolted to a flange 76 on the shaft 77. Between member 95 and shaft 83 there is located a pilot bearing 97. Between member 95 and the closure member 75 is a free-running seal 99.

Keyed to the shaft 83, as shown at 101, is a polar field member 103 having axially disposed pole-forming teeth 105 adjacent the inner cylindric surfaces of the inductor drum assemblies 85. A running seal 107 is located between members 95 and 103, and running seal 109 between members 91 and 103.

The end closure member 73 is hollow, as indicated at 111, and has a coolant (preferably a liquid) inlet 113 and a coolant outlet 115 adapted to deliver coolant through openings 117 into centrifugal scoop 23 of the member 91. In order to permit escape of this coolant, the margin of the closure member 95, where it is welded to the right-hand drum assembly 85, is provided with spaced radial impeller blades 118, beveled as shown at 119 and forming outlets 121 between them.

At numeral 123 is indicated a belt drive extending from the shaft 83 to a tachometer generator 125. This controls an exciter circuit (not shown) for coil 71. When excited, a toroidal flux field interlinks members 69, 85 and 103 (all of which are magnetic), said loop being illustrated by dotted lines 127. It will be seen that the inner cylindric surfaces of inductor drum E form a polarized magnetic gap 32 with respect to the poles 105. The passages 30 extend in an axial direction through the drum E in spaced relation to the gap 32.

In operation, the shaft 77 drives the drum E. Since the loop at 127 is polarized by the teeth 105, eddy currents are generated at the inside surfaces of the drum E, with resultant heating. The reactive flux field drives the field member 103 and therefore also driven shaft 83. Coolant entering through openings 113, 115, 117 by centrifugal action reaches the inside surfaces of the outside drum elements 24. Its amount is such that it builds up a radial head sufficient to cause it to flow through the axial openings 30 from left to right to escape through the impellers 118 and drain through opening 129. Its radial depth, however, is insufficient to reach the gap 32, which remains essentially dry. Should the passages 30 clog and dam up the coolant to a greater depth, or should this depth be increased by increased amount of coolant called for by overheating, then the coolant flows axially through the gap 32 to perform direct cooling. This additional amount of coolant also escapes through the impellers 118 and outlets 129. The impellers operate centrifugally upon the coolant flows both through passages 28, 28' and the gap 32, providing common exit forcing means. At numeral 34 is shown an opening suitable for conventional thermostatic temperature-sensing apparatus (not shown) to control a valve (not shown) admitting coolant at opening 113 in accordance with temperature change. Some coolant moves through openings 89 and cools coil 71.

Figure 5:
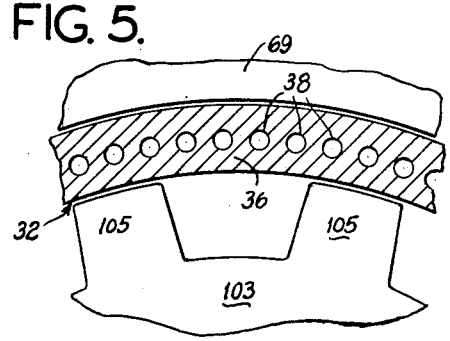
FIG. 5 is a view similar to FIG. 4, showing an alternative structure for coolant.

The form of subassembly 85 or 85', such as shown in FIG. 4, making up the eddy-current drum E, is of fabricated variety, requiring assembly of the two rings such as 24 and 26 and 24' and 26'. FIG. 5 illustrates an alternative equivalent integral type of ring lettered 36. Two of these, joined by ring 87, make up the eddy-currunt drum E. Each is cored, drilled or otherwise provided with axially directed holes 38. Holes 38 form passages for normal axial water flow through the inductor drum E.

It is here noted that, while the second form of the invention of FIGS. 3–5 has openings 30 or 38 which are shown as comparatively small for liquid coolant use, a gaseous coolant can be employed, in which event it is preferred that the openings 30 or 38 be made larger in cross section.

In FIG. 6 is shown a modification of the form of the invention shown in FIGS. 3 and 5. In FIG. 6, like numerals designate parts similar to those illustrated in said FIGS. 3 and 5. The type of drum shown in FIG. 5 is used in FIG. 6, wherein holes 38 pass through the drum segments 36. As shown in FIG. 6, the holes 38 are carried through drum segments 36 to its right-hand end for axial efflux of coolant, as shown by dart 217. This constitutes a minor part of the total flow. Near its end the drum is peripherally machined with a groove 219 which intersects the holes 38, thus providing radial outlet means for efflux of fluid, as shown by dart 221. This constitutes the major portion of the flow. The margin of the disc 95 is also notched, as shown at 223, where the disc 95 is welded within the end of drum segment 36. The notches 223 provide for efflux of coolant from gap 32, as shown by dart 225. This constitutes an auxiliary fluid flow from the gap 32.

This scheme for connecting the drum segments 36 and the disc 95 not only provides for efficient efflux of coolant but it also has the further advantage that convenient arrangement can be made for cleaning out the passages 31. This is accomplished by providing one or more ports 227 in the frame member 75. Each port is closed by a threaded removable plug 229. The center line of each port 227 is so positioned that by removing the closure 229 and employing a cleaning-out rod, cleaning of the passages 38 may be accomplished. Otherwise the operation of the FIG. 6 form of the invention is like that above described in connection with FIGS. 3 and 5.

It will be seen that both forms of the invention above desribed have in common a construction in which a magnetic gap is formed between outer poles of an inner rotor and an inside cylindric surface of an outer rotary inductor drum, the latter being formed with coolant-circulating passages in radially spaced relation to the gap and extending from one end to the other of the drum. The inductor drum carries an inwardly directed annular scoop for receiving coolant from an inlet and directing it centrifugally through said water passages. The passages are designed to transmit the amount of coolant normally required for cooling. Thus, in response to centrifugal action in the rotor, normal circulation is accommodated by these passages. On the other hand, under abnormal conditions, as when the passages are clogged or greater amounts of coolants are called for by excessive heating due to overload, a damming action occurs with spill-over to the gap between the inner cylindric surfaces of the inductor and the poles, whereupon the coolant progresses through the gap therebetween for direct cooling to provide additional cooling. Ultimately, when the dammed-up coolant (when liquid) is dipped into by the ends of the poles, a signal is provided by irregular action indicating that corrective steps may be required, such as reducing the load or cleaning out the indirect cooling passages.

It will be understood that although conventional thermostatic means (not shown) may be used for coolant volume control, the invention may be employed with manual control. Thus excessive temperature may be observed at a thermometer, as for example in an opening such as 40 (FIG. 1), and the coolant demand thus indicated regulated by hand at a valve in the line serving opening 27.

It may be noted that each scoop (14, FIG. 1, or 91, FIG. 3) extends inward to a margin which lies within a cricle passing through the ends of the poles of the respective field member. This assures a build-up of a radial head for large spill of coolant (when liquid) into the gap under extremely abnormal conditions, whereupon deep submergence of the pole ends in the deep coolant in the gap will, through unsteady action, signal said conditions. It will be understood, however, that for slight abnormalities of clogging and/or overheating, the spill into the gap will ordinarily be small enough to bring about direct cooling through a thin film not reached, or only just reached, by the pole ends. Under such conditions, unsteady operating conditions with coolant in the gap are at a minimum.

In FIGS. 7 and 8 is shown a form of the invention in which air cooling only is envisaged. In these drawings, numeral 131 in general indicates the casing, consisting of two magnetic rings 133, bolted together and adapted to support a central annular exciter field coil 135. At the ends of the assembly 131 are bolted end members 137 and 139. A drive shaft 141 is supported in a bearing 143 within the member 139. Supported upon a bearing 145 in the member 137 is a driven shaft 147. At 149 and 151 are shown members of a pair of magnetizable coaxial inductor drums composed of iron, steel or the like, each having comparatively widely spaced and radially deep fins 153 and 155, respectively. Surrounding the fins 153 and 155 are welded magnetizable iron or steel shrouds 157 and 159, respectively. The drums 149 and 151 are joined by a welded nonmagnetic ring 161, and shrouds 157 and 159 are joined by a welded nonmagnetic ring 163. The cross section of the resulting composite ring structure is as shown in FIG. 8, wherein the axially disposed spaces between members 149, 153 and 157 constitute air passages 165 of a substantial volumetric capacity. Mounting of the composite ring structure is effected by welding or otherwise fastening the left-hand inner drum 151 to a support 167. Adjacent the outside cylindric shapes of the shrouds 157 and 159 are the inside cylindric shapes of rings 133. An outside gap is thus formed at 169.

Support 167 is supported upon a bearing 171 carried in a hub 173 of the member 137. At 175 are shown free-running packless seals. Welded to the right-hand end of the drum 149 is a second support 177 which is bolted to a flange 179 of the shaft 141. Between the support 177 and shaft 147 is a pilot bearing 181. Between members 177 and 139 is a free-running seal 183.

Keyed to the shaft 147, as shown at 185, is a magnetizable polar field member 187, having axially disposed pole-forming teeth 189, the ends of which are in cylindrical array adjacent the inner cylindrical surfaces of drums 149 and 151. A running seal 191 is located between members 187 and 177, and a running seal 193 between members 187 and 167. Supports 167 and 177 are provided with openings 195 and 197, respectively. The margin of support 167 is formed with a plurality of radially extending outlet-forming vanes 199. The outlets are in communication with the passages 155, 153. The end members 137, 139 contain air inlet openings 201 and 203, respectively. At numeral 205 is indicated a belt drive, extending from the shaft 147 to a tachometer generator 207. This controls an exciter circuit (not shown) for coil 135. In view of the above, it will be seen that the inner cylindrical surfaces of the drums 149, 151 form a gap with respect to the poles 189.

The operation of the FIG. 7 form of the invention is as follows, assuming coil 135 to be excited:

Shaft 141 rotates the assembly constituted by the integrally organized magnetizable drums 149, 151, 157, 159 and their connecting fins 153. This rotating assembly of drums is traversed by the toroidal magnetic loop around the coil 135. This loop is illustrated by dotted lines 209 at the top of FIG. 7. To the left of coil 135, the loop passes through the left-hand ring 133, outside gap 169, shroud 159, fins 155, drum 151, the inner gap 211 and into the pole-forming teeth 189. From here the loop passes through the teeth 189 to the right and then outward again through gap 211, drum 149, fins 153, shroud 157, outer gap 169, and the right-hand ring 133, returning to the left outside of the field coil 135. Thus eddy currents are generated in the drums 149, 151 which produce magnetic reactions well known in the art, whereby a coupling action occurs between member 187 and drums 149, 151 and consequently a drive between shafts 141 and 147. There is some slip between the motions of shafts 141 and 147, which decreases with increase in excitation of the field coil 135.

Heat generated is carried off by a current of air which flows into the openings 203, through the passages 165 and out through the ports formed at 199. The ports at 199 act as centrifugal pumps to induce air flow through these passages 165. The pumped air escapes through openings 213 in the left-hand ring 133. Some air is drawn in through ports 197, passing through the space between teeth 189 and escaping through ports 195 to the outlets 213. Some air may also circulate through ports 201 and a set of ports 215 in the second right-hand ring 133.

From the above it will be seen that the form of the invention shown in FIG. 7 has in common with the forms shown in FIGS. 1 and 3 the feature that the coolant is centrifugally pumped for flow through substantially axial passages along the rotating inductor member attached to the drive shaft. Moreover, the form shown in FIG. 7 has the analogy to the form shown in FIG. 3 in that the axial-flow passages are surrounded inside, outside and transversely by magnetizable material, carrying parts of magnetic loop 209. This feature maximizes the area of contact between the coolant and the material in which eddy currents flow, regardless of the question of whether the coolant is liquid, as shown in FIG. 3, or gas, as shown in FIG. 7.

The various passages such as 4 in FIG. 1, 30 and 30' in FIGS. 3 and 4, 38 in FIG. 5 and 165 in FIG. 7 have been referred to as being substantially axial, and it will be understood that this term includes within its meaning the provision of some skewing, if desired, of these passages.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. An electrical machine comprising a rotatable polar field member, a surrounding rotatable inductor forming a magnetic gap with the outside of the field member, a fixed annular field coil magnetically interlinking said field member and said inductor, said inductor having substantially axially disposed coolant passage means therethrough spaced exteriorly with respect to said gap and adapted to carry a coolant from a first to a second side of the field member, and centrifugal means on said inductor toward one end of the field member adapted during rotation to move coolant centrifugally through said coolant passage means and through said magnetic gap from one side to the other of said field member.

2. An electrical machine according to claim 1 wherein said annular field coil is flanked by pole rings, all of which surround said inductor to form a second magnetic gap, whereby a toroidal magnetic loop is established around said coil, pole rings, inductor and polar field member across which said coolant flows in a substantially axial direction.

3. An electrical machine according to claim 1, wherein said centrifugal means is arranged relative to said passage means to force the coolant from the centrifugal means into the passage means and said magnetic gap.

4. An electrical machine according to claim 1, wherein said centrifugal means is arranged relative to said passage means to induce the coolant to flow from the passage means to the centrifugal means.

5. An electrical machine according to claim 2, wherein said centrifugal means is arranged relative to said passage means to induce the coolant to flow through the passage means to the centrifugal means.

6. An electrical machine according to claim 5, wherein said passage means carry air in substantial volume.

7. An electrical machine comprising a rotatable polar field member, a surrounding rotatable inductor forming a magnetic gap with the outside of the field member, a fixed annular field coil magnetically interlinking said field member and said inductor, said inductor having coolant passage means therethrough spaced exteriorly with respect to said gap and adapted to carry coolant from a first to a second side of the field member, centrifugal pumping means on said inductor adapted during rotation to move coolant centrifugally through said passage means, said centrifugal means and said magnetic gap having communicating means therebetween for movement through said magnetic gap of additional amounts of coolant.

8. An electrical machine according to claim 7, including common exit means for coolant that may flow from said coolant passage means and said gap.

9. An electrical machine according to claim 8, wherein said exit means comprises a centrifugal impeller.

10. An electrical machine according to claim 7, wherein said inductor is constituted by at least one cylinder having spaced exterior fins surrounded by a wall to form said coolant passage means.

11. An electrical machine according to claim 10, including a solid spider axially spaced from the cylinder to form said communicating means, and wherein said centrifugal means is constituted by extensions of said fins which connect with the margin of the spider to support the cylinder.

12. An electrical machine according to claim 11, wherein the exterior of the cylinder is flared to form a restriction in said passage means to form a deflector adjacent said communicating means.

13. An electrical machine according to claim 7, wherein said inductor comprises at least one integral cylinder having openings therethrough extending parallel to its axis.

14. An electrical machine according to claim 7, wherein said inductor comprises at least one composite cylinder formed by an outside cylindrical component and an inside cylindrical component, one of said components having axial fins engaging the other to form the coolant passages.

15. An electrical machine according to claim 14, wherein said fins are carried on the inside component.

16. An electrical machine according to claim 14, wherein said rotatable field member has outwardly extending poles, and wherein the scoop means comprises an annular portion extending inward from said inductor a radial distance reaching substantially within a circle passing through the ends of said poles.

17. An electrical machine according to claim 7, wherein said inductor comprises a pair of axially connected cylinders, each having openings therethrough extending parallel to its axis.

18. An electrical machine according to claim 17, wherein each of said cylinders is of integral form containing said openings.

19. An electrical machine according to claim 17, wherein each of said cylinders is of composite form consisting of an outside cylindrical component and an inside cylindrical component, one of said components having axial fins engaging the other to form the coolant passages.

20. An eddy-current electric coupling comprising a rotatable field member having outwardly extending poles, a surrounding rotatable interiorly cylindric eddy-current inductor forming a magnetic gap with the outsides of the poles, fixed annular exciter field coil magnetically interlinking said field member and said eddy-current inductor, said inductor having coolant passage means spaced outward from said gap and adapted to carry liquid coolant from a first to a second side of the field member, centrifugal scoop means on said inductor adapted to receive said liquid coolant therein and deliver it centrifugally outward relative to said gap and into said passage means for movement in certain amounts exclusively through the passage means, and an inwardly extending communication means between said passage means and the gap for additional movement from the centrifugal means to and through the gap of additional amounts of liquid coolant.

21. An electrical machine comprising a field member, a surrounding rotatable inductor forming a magnetic gap with the outside of the field member, said inductor having coolant passage means therethrough spaced exteriorly with respect to said gap and adapted to carry liquid coolant from a first to a second side of the field member, a communicating means disposed adjacent said first side of said field member and adapted to direct movement of said liquid coolant into and through said gap of certain additional amounts of coolant as said passage means may be unable to accommodate.

22. An electrical machine comprising a field member, a surrounding rotatable inductor forming a magnetic gap with the outside of the field member, said inductor having coolant passage means therethrough spaced exteriorly with respect to said gap and adapted to carry coolant from a first to a second side of the field member, duct means on said inductor adapted to receive coolant therein and deliver it to said passage means for movement therethrough, said duct means and the gap having communication means therebetween for movement from the duct means into and through said gap of certain additional amounts of coolant as said passage means may be unable to accommodate.

23. An electrical machine comprising a housing, a polar field member therein, a surrounding rotatable inductor drum member therein forming a magnetic gap with the outside of the field member, said drum member having coolant passage means therethrough spaced exteriorly with respect to said gap and adapted to carry coolant from a first to a second side of the field member, first and second supporting rotatable means at opposite ends of said drum, means providing openings adapted to introduce coolant through the first supporting means, and means providing openings affording efflux of coolant from the end of the drum adjacent the second supporting means, said last-named means comprising axially directed exits from said passages at the end of the drum, radial outlet means from said passages adjacent the same end of the drum, and openings in the second supporting means also adjacent the same end of the drum.

24. An electrical machine according to claim 23, including means in the housing forming openable port means providing access to said axially directed exits.

25. An electrical machine as set forth in claim 1 wherein said coolant is a liquid coolant and wherein the additional amounts of said liquid coolant which are moved through said magnetic gap are amounts which said passage means may be unable to accommodate.

26. An electrical machine as set forth in claim 7 wherein said coolant is a liquid coolant, and wherein the additional amount of coolant moved through said magnetic gap is determined by the amount of coolant able to be accommodated by said passage means.

References Cited in the file of this patent

UNITED STATES PATENTS 2,287,953    Winther _____ June 30, 1942

FOREIGN PATENTS 558,961    Great Britain _____ Jan. 28, 1944